Nov. 17, 1953  W. H. SCHLENDER  2,659,555
AIRCRAFT WITH QUADRICYCLE LANDING GEAR
Filed July 27, 1951  3 Sheets-Sheet 1
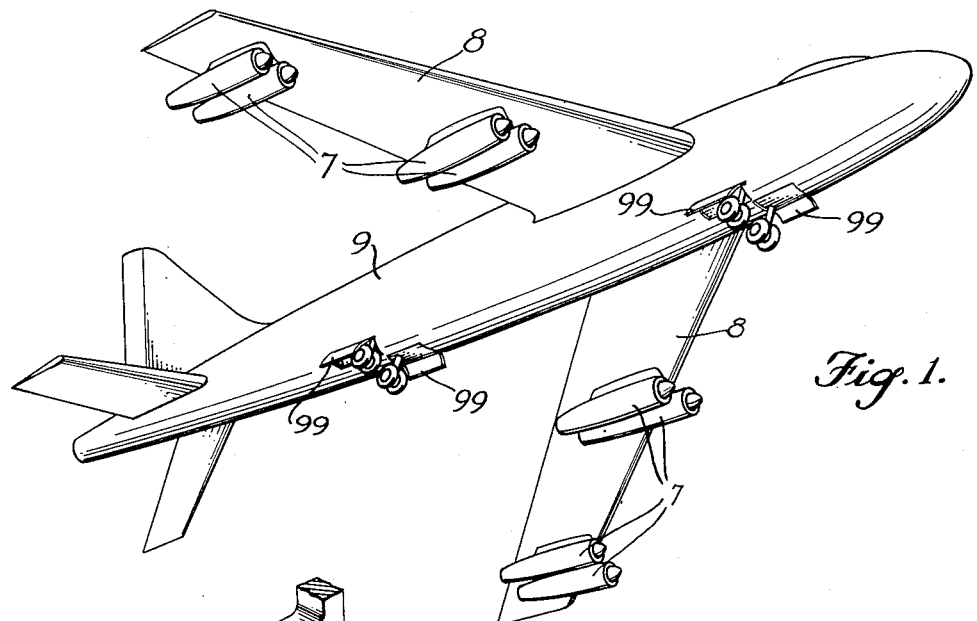
Fig. 1.
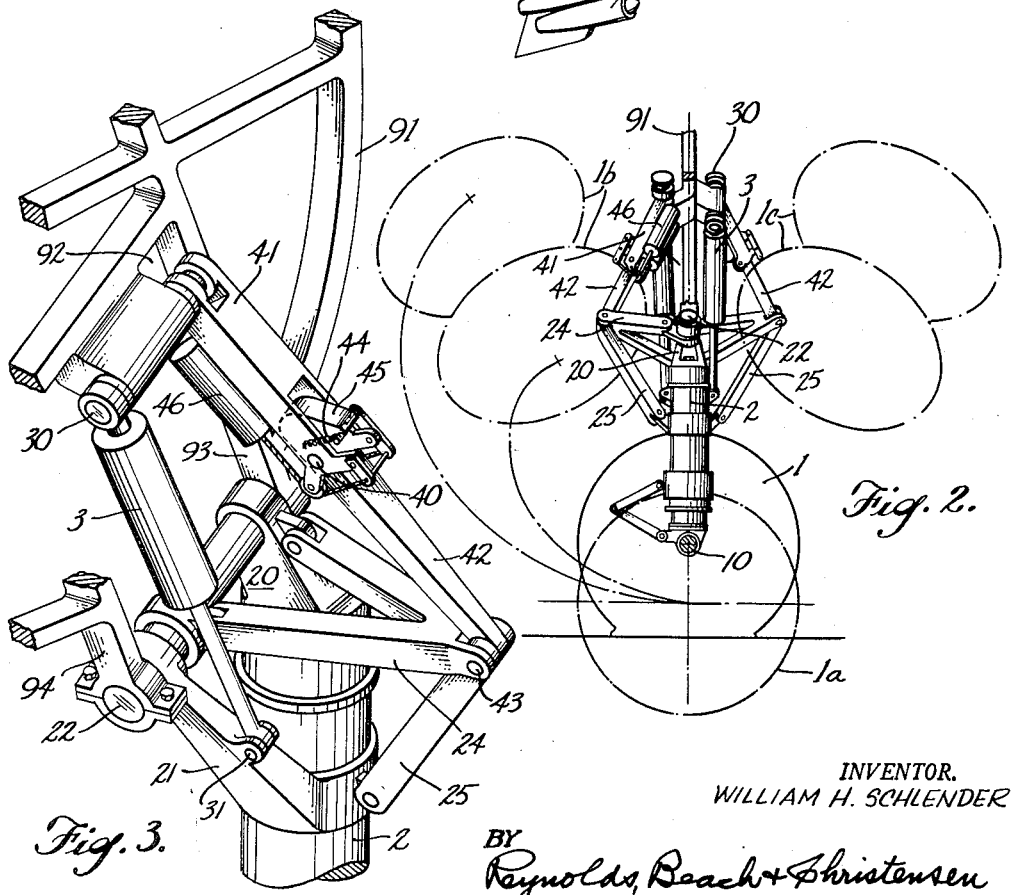
Fig. 2.
Fig. 3.
INVENTOR.
WILLIAM H. SCHLENDER
BY Reynolds, Beach & Christensen
ATTORNEYS

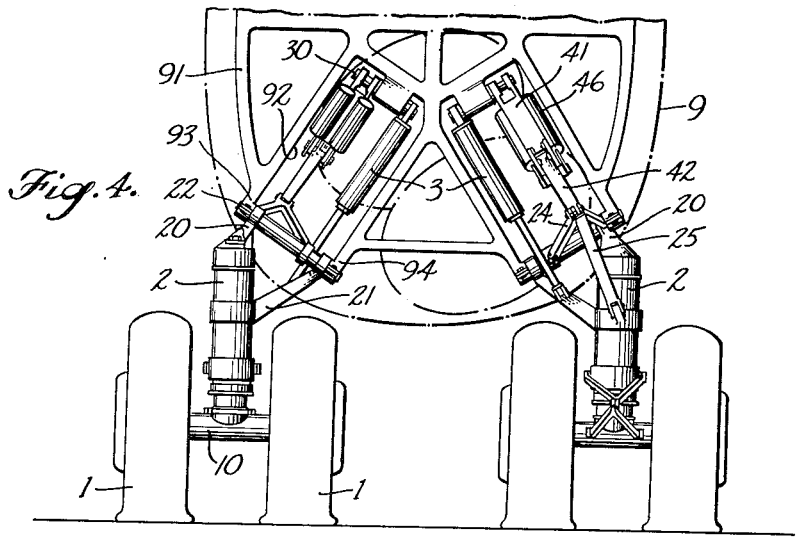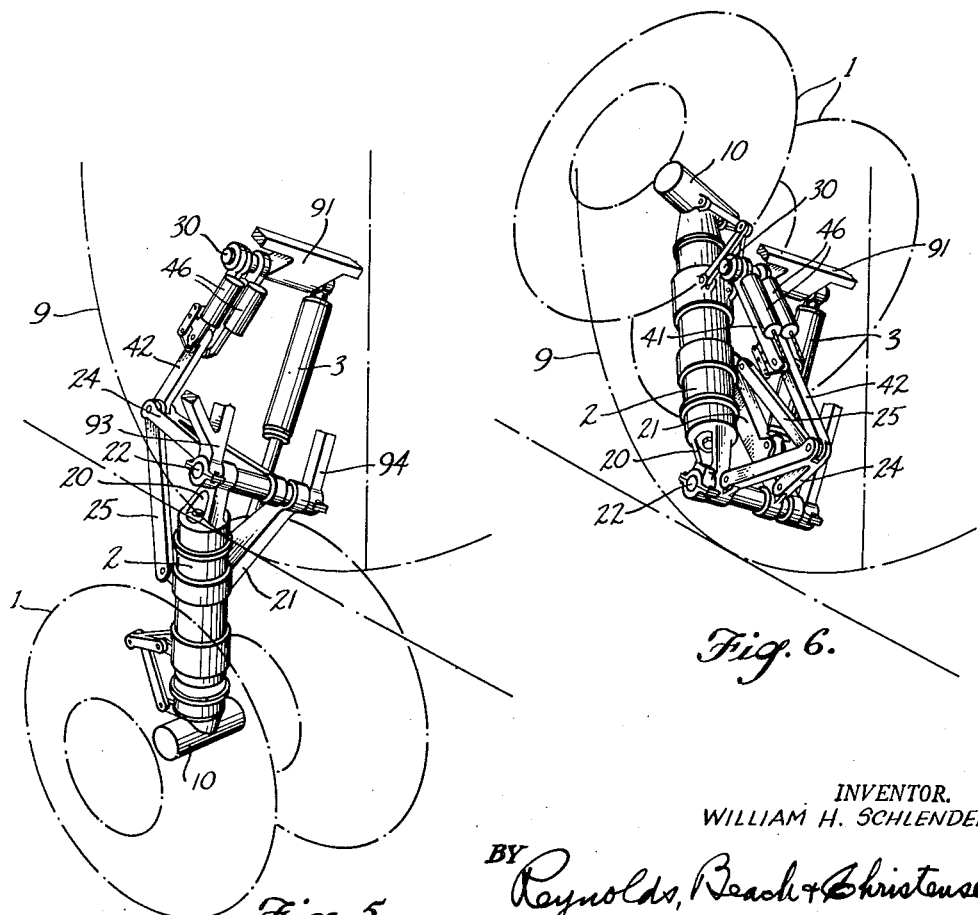

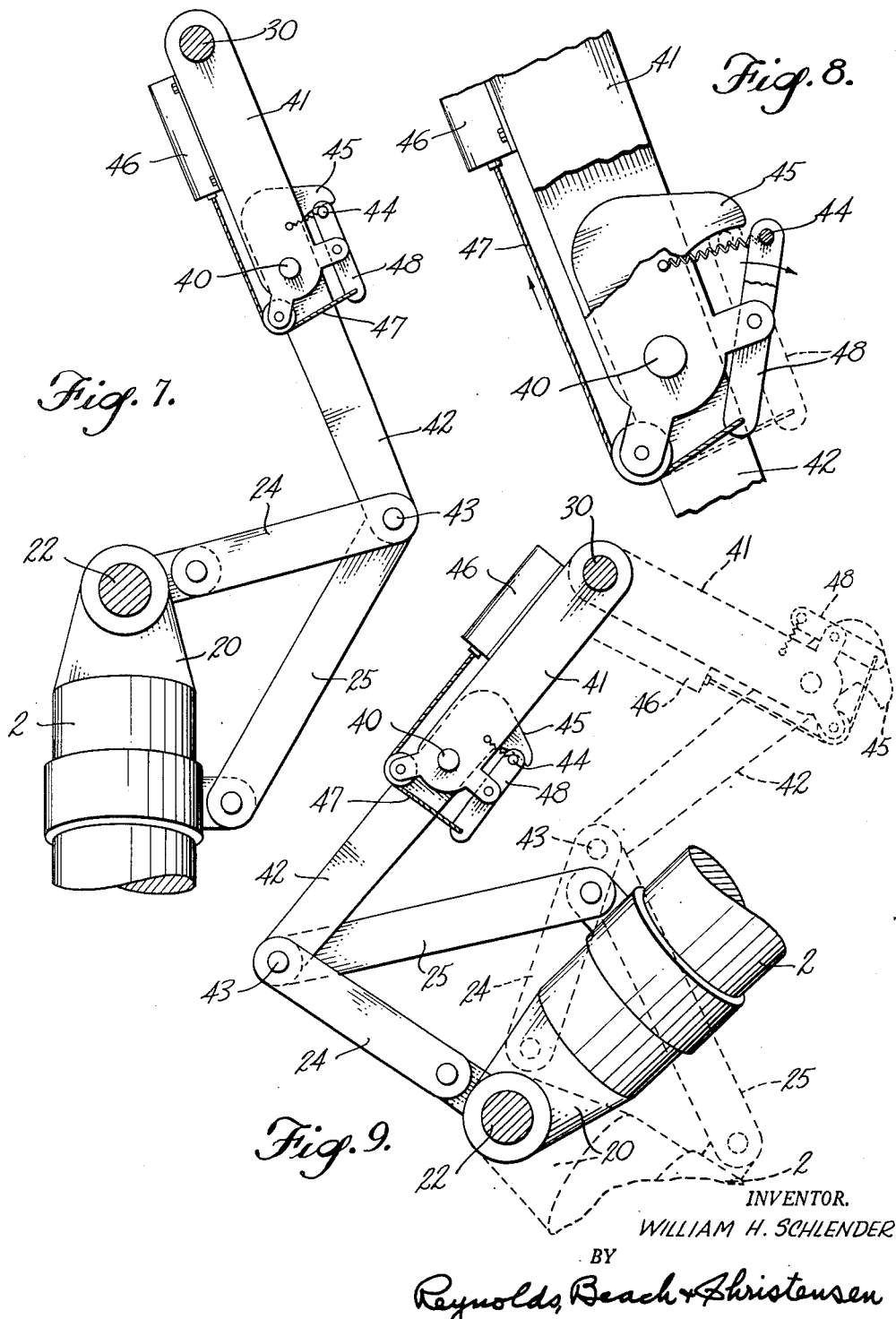

Patented Nov. 17, 1953

2,659,555

UNITED STATES PATENT OFFICE 2,659,555

AIRCRAFT WITH QUADRICYCLE LANDING GEAR

William H. Schlender, Seattle, Wash., assignor to Boeing Airplane Company, Seattle, Wash., a corporation of Delaware Application July 27, 1951, Serial No. 238,876

8 Claims. (Cl. 244—102)

1

Large high-speed aircraft propelled by multiple jet engines are purposely designed with thin, very flexible wings, and it is a very serious design restriction in this type of airplane, as distinguished from propeller-driven airplanes, if the landing units or elements, and their retracting mechanism, have to be mounted upon or beneath the wing, and from such outboard points must support any appreciable part of the weight of the aircraft. Not only the weight of these parts, but likewise the loads they would sustain, would require the stiffening of the wing, and probably its thickening, but in addition it would be difficult to house the landing elements within the thin wing section, or within the jet pods, yet any unnecessary protuberance, notwithstanding fairing and the like, will increase the drag, and therefore decrease the effective range and the speed of the aircraft.

In previous designs of such aircraft (see the patent to Van Zelm et al., No. 2,483,027, dated September 27, 1949) it has been attempted to solve the difficulty by supporting the aircraft on the ground primarily by means of a so-called bicycle or tandem arrangement constituting a single fore and a single rear landing unit each capable of projecting downwardly from the fuselage in the longitudinal vertical central plane, and of retracting upwardly in that plane within the fuselage. While dual wheels have been used, to afford greater area and distribution of ground contact, even so such landing gear is comparable to a bicycle, and afforded no outboard support, for the lateral stability of dual wheels is inconsequential in a large airplane, and they are not used on a small airplane. It was still necessary to provide outrigger gears on the wings, which had to be designed to absorb considerable loads, and for use in all circumstances, whenever the airplane is ground-borne, and this still required a material compromise in the design of the wing, and of the jet engine pods. Such outrigger gears, of course, can be made the lighter the farther out from the longitudinal center line of the fuselage they are located, and yet the farther from the longitudinal center line of the fuselage the greater loads would they constitute in flight upon the structure of the thin flexible wings, and the more difficult would it be to fair them in fully when retracted.

Quadricycle landing gears are known, per se, but in order to afford a laterally broad base of stability it has been considered necessary to mount at least two, or sometimes all four, of the landing units on the wings or engine nacelles or

2 jet pods, outboard of the fuselage, wherefore the wings have had to be designed of sufficient strength to assume the necessary loading, and the wings, nacelles, or jet pods had to be thick enough to receive the outboard landing units, each of which design factors ordinarily precludes the use of a thin, highspeed airfoil section, or at best (and especially if dual wheels are used for better load distribution) requires drag-producing fairing for such portions of the landing units as can not be housed within the wing. In distinction to such known quadricycle landing gear arrangements, it is an object of this invention to support the four landing gear units of a rectangular quadricycle landing gear (two fore units and two rear units, with those at the respective sides aligned front and rear) wholly upon the fuselage, which is or can be made adequately strong to absorb the loads transmitted through such units, in such a way that they can be housed, when retracted, wholly within recesses in the fuselage, and with their dual wheels virtually in alignment one with another in the vertical longitudinal plane of symmetry, yet can spread widely enough laterally when extended to afford, without more, an adequately broad and stable base of support. By such arrangement it is possible to achieve the broader objective, of leaving the wing wholly free of any ground-support or stabilizing functions, or of any fairing or other protuberance for housing landing units, wherefore the wing design can be controlled primarily by aerodynamic factors, with no loading other than the support of the jet engines themselves to require modification from purely aerodynamic considerations.

It is an object, moreover, to provide such an aircraft and landing units in association therewith in which each landing unit as a whole is a duplicate of each other unit, thereby simplifying procurement and replacement problems, and in which each unit is arranged for retraction and extension substantially simultaneously with other units, and in a manner to avoid completely any shift, laterally or longitudinally, of the center of gravity arising from their retraction or extension.

It is a further object to simplify the design of the aircraft, with particular reference to the absorption of the loads imposed upon it by or through the landing units, by mounting the two units of each pair, the fore and the rear pairs, respectively, each upon a single bulkhead, whereby that bulkhead may be specially designed to receive and absorb all loads so imposed upon or transmitted to it, including, preferably, the loads required for extension and for retraction.

It is a further object to improve the stability of such a landing arrangement, and of the aircraft which is thereby supported, and at the same time to lessen the size of individual ground-contacting elements, so that they, and the landing units as a whole, may be fully and completely retracted within the outline of the fuselage, by employing dual landing wheels for each unit, each wheel whereof is thereby capable of being made smaller than if a single wheel only were required to absorb the entire load at touching down. Nevertheless, considered in the broader sense, each dual pair of wheels constitutes but a single cycle or support.

It is a further object to provide a simple arrangement for retracting, locking, and unlocking the landing gear, and to provide preferably a single bracing or locking strut for retaining and locking the landing gear in extended position, and likewise in retracted position, together with lock-releasing means capable of remote control, and movable with the locking strut to release the same from either such position, when required.

With the above and other objects in mind, as will appear hereinafter as this specification progresses, the present invention comprises the novel aircraft and landing gear in combination one with the other, and the novel details of the landing gear in its relation to such a fuselage and aircraft, all as shown in the accompanying drawings in an illustrative form, and as will be more particularly described in this specification and defined by the claims which terminate the same.

Figure 1 is a perspective view of such an aircraft, as though seen from below in flight, but with the four landing units down.

Figure 2 is a side elevational view of a pair of such landing units, both supported from a single bulkhead, showing parts in full lines in the extended or landing position, and in dot-dash lines in the retracted position.

Figure 3 is an isometric view of the upper end of one such unit, showing in association therewith parts of the fuselage bulkhead and the retracting and locking mechanism associated with the landing unit.

Figure 4 is in the nature of a transverse sectional view through the fuselage, showing the two landing units of a given pair in elevation as viewed from the front or the rear.

Figure 5 is an isometric view of a single unit in extended position, illustrating its relationship to the fuselage and to the center line thereof, and Figure 6 is a similar view of the same unit in retracted position, likewise illustrating its relationship to the fuselage.

Figure 7 is an elevational view, looking in a direction laterally outwardly and parallel to the axis of the pivot support, illustrating the locking strut and other parts in extended position, with the locking means engaged; Figure 8 is an enlarged detail, showing the locking means disengaged; and Figure 9 is a view similar to Figure 7 showing, in dotted lines, a position of the parts intermediate retracted and extended positions, and in full lines the parts in retracted position and the locking means reengaged.

The aircraft is shown as a large multijet aircraft, including the fuselage, generally indicated by the numeral 9, the thin flexible wings 8, and the outboard jet engine pods 7 supported beneath the wing. The design illustrated is intended to represent no specific aircraft, but merely a conventional, possible aircraft, such as the present invention would be employed in conjunction with.

The internal design and construction of the fuselage is not material to the present invention save for the incorporation at two stations of individual transverse bulkheads 91, which are especially designed to mount the respective pairs of landing units of this invention, and to absorb the loads transmitted from such landing units. The details of the bulkheads 91, as far as they are pertinent to the understanding of this invention, will be described hereinafter. Presently it may be noted that as viewed in Figure 1, one such bulkhead is located towards the nose of the fuselage, and the other toward the tail, so that they are widely separated, adequately to give the aircraft, when ground borne, adequate longitudinal stability, and a correct attitude for landing and taking off. Just ahead of each such bulkhead 91 is a well to receive one unit of the landing gear, and just rearwardly of the same bulkhead is a second well, but on the opposite side of the longitudinal vertical center plane, to receive the other unit of the pair.

All landing units are preferably of identical construction. Generally speaking, each includes a substantially upright telescopic shock strut 2, the internal structure of which is not material to this invention, but which incorporates means for absorbing and damping the loads of landing and taxiing. Certain features of the landing unit per se constitute the subject matter of a companion application of Wendell B. Fehring, Serial No. 247,061, filed September 18, 1951. At its lower end each such unit mounts a transverse axle or equivalent member, indicated at 10, for the reception of a single or dual wheels 1, and in each dual unit the two wheels 1 (which functionally are the equivalent of only a single wheel) lie at opposite sides of the shock strut 2. Each shock strut 2, by means such as are indicated at 20 and 21, which are directed laterally inwardly, mounts a pivot spindle or pin 22, which is disposed upon an axis which is inclined upwardly and outwardly from the longitudinal vertical central plane of the fuselage 9 (see Figure 4). There, at the lower open end of a notch 92 in the bulkhead 91, the pin 22 is pivotally mounted within the fuselage upon appropriate means, such as the ears 93 and 94 constituting a pivot support, and which are a part of the bulkhead. While the axis defined by the pin 22 is inclined laterally, it preferably lies in the plane of the bulkhead 91 or substantially so, and thus the pivot axes of the two landing units of each pair are coplanar, but each inclines upwardly and outwardly from the longitudinal vertical central plane of the fuselage. The effect of this is to swing outwardly the swinging, wheel-mounting ends of the paired landing units to widely spaced positions at opposite sides of that plane.

The retracting mechanism is shown herein as consisting of a jack 3, which is pivotally mounted at 30 at the upper or closed end of the notch 92, and directly upon the bulkhead 91, and its other relatively movable end is similarly connected at 31 to the shock strut 2 or to the arm 21 which mounts the same. Since the connection at 31 is outboard of the pivot axis at 22, extension of the jack 3 will tend to move the strut 2 downwardly as it also swings outwardly into substantially upright position.

The movement of the shock strut is limited, and it is secured in extended position, by means of a locking strut consisting of two parts 41 and 42, hingedly connected together at 40 for articulated movement, and connected pivotally, the upper part 41 to the bulkhead 91 in prolongation of the pivot axis at 30, and the lower part 42 to the shock strut or to a bracket arm 24 which is braced at 25 from the shock strut, and which carries a pivot connection at 43 to the element 42 of the locking strut.

The articulated locking strut 41, 42 is of a length to locate the shock strut 2 substantially in upright position when extended, but in order to retain parts in such position and to lock them, a locking element, represented by the pin 44, supported from the upper element 41, is engageable with a hook 45 which is carried by the lower element 42. These locking means are releasable from a distance, and as representative of means to this end there is an actuator 46 carried by the element 41 of the locking strut which is operatively connected, as by a pull cord 47 and lever 48, to the pin 44 to withdraw the same from the hook 45 when the actuator 46 is energized. The pin 44 and the hook 45 automatically reengage when parts reach the extended position, with the elements 41 and 42 of the locking strut in alignment.

Parts are so designed and located that the parts 41 and 42 of the locking strut, when disengaged, will swing relative to one another on their common pivot at 40, and will pass through the notch 92 to the opposite side thereof, and when the shock strut 2 is in its retracted position the bracket arm 24 will lie at the opposite side of the bulkhead 91 from its position when parts are in extended position, and the locking strut 41, 42 will again be extended with its parts in alignment, and the locking means 44, 45 will again engage automatically and retain parts in retracted position. Compare Figures 5 and 6, and see Figures 7, 8 and 9. In the same manner as before, the actuator 46, when energized, will pull the locking pin 44 away from the hook 45 to release the locking means, and permit the locking strut to be broken and to swing again through the notch 92 towards and into extended position. All such movement of the shock strut 2 and associated parts occurs through the medium of the jack 3, and by proper manipulation and control of the same (except as the separate energization of the actuator 46 effects release of the lock).

Coming now to the general arrangement of the parts, it will be observed (see Figure 2, in particular) that a given bulkhead 91, whether it be the forward one or the rearward one, mounts each of the two identical landing units and the operating mechanism for each thereof, so that no other part of the aircraft in the vicinity of this particular bulkhead is required to be designed to receive and absorb any of the landing loads. Conversely, this single bulkhead may be properly designed to receive and absorb all such loads. The design of the fuselage and of the aircraft as a whole is greatly simplified thereby, and not the least of the simplification thereby accomplished is that the landing units are mounted upon and connected to the fuselage directly, rather than to the wing structure at any point.

By placing the pivot axis 22 for retraction in an inclined position, as already described, and by mounting the identical landing units of each pair so that one thereof swings forwardly in retracting, and the other swings rearwardly, the two paired landing units, as seen best in Figure 4, are spread laterally widely apart when extended, so that in conjunction with the other pair they constitute a wholly stable four-point support, laterally as well as longitudinally, adequate for alighting and taxiing, yet when they are retracted by simultaneous actuation of the four jacks 3, each landing unit swings upwardly and inwardly, one unit of a pair swinging forwardly and the other unit of the same pair swinging rearwardly, until they all lie in virtual alignment wholly within the fuselage, as Figure 4 shows. Indeed, the wheels of each unit in effect straddle the longitudinal vertical central plane of the fuselage.

One result of this arrangement and construction is that the wheels and landing units, as a whole, when retracted, lie close to the longitudinal center line, and by but little, or not at all, produce outboard loads at a moment arm about the center of gravity. Moreover, since the two retract and extend conjointly, one forwardly and one rearwardly, there is no shift whatsoever of the center of gravity occasioned by the actions of retracting or extending, either in the longitudinal or in the lateral sense.

Figure 2 shows in effect in solid lines the ground-borne position of the four wheels of a given pair of landing units, at 1a the position of the same wheels when the aircraft is air-borne, with the landing gear still extended, and illustrates at 1b the location of the dual wheels of one unit when retracted, and at 1c the corresponding retracted position of the other wheels of the pair. The locus of the ends of the axes of the wheels from 1a to 1b is shown also in dot-dash lines. As Figure 6 shows, the wheels when thus retracted lie wholly within the outline or skin of the fuselage, and the openings through which they are retracted are in such cases closed by appropriate doors 99, which in effect form, when closed, parts of the skin of the fuselage.

The provision of wing-tip protective wheels is not to be ruled out, but these, if used, would be for the primary purpose of holding the wing tip from ground contact only in the event of a decided lateral tilt such as would rarely occur, but not to support the aircraft while ground-borne. Normally the entire load of the aircraft would be assumed by the wheels 1, and the wing-tip wheels, if used, would assume no appreciable portion of the entire load, would not contact the ground under any normal circumstances, hence could be made adequately small and light.

I claim as my invention:

1. An airplane comprising a fuselage, four transverse pivot supports carried by and located within the fuselage, arranged in a fore pair and a rear pair, the pivot supports of each pair defining pivot axes which are inclined upwardly and outwardly at the respectively opposite sides of the longitudinal vertical central plane of the fuselage, said fuselage being recessed forwardly of one pivot axis of each pair and rearwardly of the other pivot axis of the same pair, for the reception, when retracted, of the respective landing units of such pair; four like landing units, each comprising a shock strut which is generally upright when extended in landing position, and the upper end of which is pivotally mounted upon its corresponding inclined pivot support, a ground-contacting element at the lower end of each shock strut, retracting mechanism mounted within and reacting from the fuselage, and operatively connected to each landing unit to swing each thereof, with its ground-contacting element, upwardly and inwardly of the fuselage about its inclined pivot axis, and respectively forwardly or rearwardly, as the case may be, into its recess in the fuselage, from its outspread and upright landing position to its retracted position, the location of the respective pivot supports and the inclination of their pivot axes being so related to the fuselage shape and the shape of the landing units as to move the two ground-contacting elements of each pair into the vicinity of such longitudinal vertical central plane within the fuselage when retracted, and to spread them widely enough when extended to afford, per se, lateral stability to the airplane when ground-borne.

2. The combination defined in claim 1, wherein the two pivot supports of a pair have their pivot axes located in a common transverse plane.

3. The combination defined in claim 1, wherein the fuselage includes two transverse bulkheads, one disposed in the plane of and itself mounting the pivotal supports for each of the respective pairs of shock struts, and each constructed and arranged to resist within itself all landing and taxiing loads transmitted by the corresponding pair of landing units.

4. The combination of claim 1, characterized in that the ground-contacting element of each of the four landing units consists of dual landing wheels disposed at opposite sides of the corresponding shock strut.

5. The combination of claim 1, wherein the pivot supports of the two shock absorbers of each pair are located and so inclined, with relation to the limits of movement afforded by the respective retracting mechanisms, to swing each ground-contacting element of the pair substantially into retracted position straddling the vertical longitudinal center plane of the fuselage.

6. The combination of claim 1, wherein the retracting mechanism includes a bracket arm offset longitudinally from the pivot axis, forwardly for one unit of each pair and rearwardly for the other unit of each pair, locking means extending between the fuselage and the outer, swinging end of said bracket arm, operable to retain its landing unit in retracted and in extended positions, respectively, and remotely-controlled lock-releasing means operatively connected to and movable with said locking means.

7. The combination of claim 1, wherein the fuselage includes a forward and a rear bulkhead each formed with two notches each closed at its upper end, and inclined inwardly and upwardly, the respective pivot supports of the respective pairs of landing units being located transversely of the lower ends of said notches, four retracting jacks each pivotally mounted upon the corresponding bulkhead adjacent the closed upper end of the respective notches, and each operatively connected to its corresponding shock strut at one side of the latter's pivot support, to swing through the notch during projection and retraction, a bracket arm directed rearwardly from the pivot support of the unit which retracts rearwardly, and forwardly for the unit which retracts forwardly, and an articulated locking strut remotely-controlled, and extending between the fuselage bulkhead, in the vicinity of the closed end of each notch, to the outer swinging end of each bracket arm, and also swinging through the notch during projection and retraction.

8. The combination of claim 7, wherein each locking strut is formed in two parts pivotally connected and locked together, and pivotally connected at its ends to the bulkhead and to the shock strut, respectively, and located to swing through the corresponding notch in the bulkhead, the two parts being of a combined length to lie in alignment with one another when the shock strut is in extended position and likewise when in retracted position, and remotely-controlled lock-releasing means carried on one part adjacent their common pivot.

WILLIAM H. SCHLENDER.

References Cited in the file of this patent

UNITED STATES PATENTS

| Number | Name | Date |
|---|---|---|
| 2,180,526 | Johnsen | Nov. 21, 1939 |
| 2,360,759 | Chalberg | Oct. 17, 1944 |
| 2,405,651 | Height | Aug. 13, 1946 |
| 2,457,884 | Fulton | Jan. 4, 1949 |
| 2,483,027 | Van Zelm | Sept. 27, 1949 |

FOREIGN PATENTS

| Number | Country | Date |
|---|---|---|
| 510,164 | Great Britain | July 27, 1939 |

OTHER REFERENCES

Fairchild: "Western Flying Magazine," August 1950, page 17.